United States Patent [19]

Brogdon, Jr.

[11] 3,941,341

[45] Mar. 2, 1976

[54] QUICK-RELEASE ROLLER ATTACHMENT FOR SUPPORTING A ROPE OR HOSE AND THE LIKE ON AN AERIAL LADDER

[76] Inventor: Glenn F. Brogdon, Jr., 14505 Hamowell St., Manassas, Va. 22110

[22] Filed: Dec. 13, 1974

[21] Appl. No.: 532,728

[52] U.S. Cl. .................. 248/55; 248/210; 182/129

[51] Int. Cl.² .......................................... H02G 3/04

[58] Field of Search .......... 182/206, 214, 107, 108, 182/129; 248/210, 55

[56] References Cited

UNITED STATES PATENTS

| | | | |
|---|---|---|---|
| 693,646 | 2/1902 | Groff | 182/66 |
| 1,030,905 | 7/1912 | Lucas | 182/206 |
| 1,393,048 | 10/1921 | Stiles | 182/206 |
| 1,695,428 | 12/1928 | Johnson | 182/206 |
| 3,602,467 | 8/1971 | Thomas | 248/210 |

*Primary Examiner*—Reinaldo P. Machado
*Attorney, Agent, or Firm*—Shoemaker and Mattare, Ltd.

[57] ABSTRACT

A quick attaching and quick releasing roller attachment for aerial ladders on fire fighting equipment and the like to support a rope or hose and the like on the ladder includes a pair of spaced, rung embracing channels carried by an overcenter type linkage, and rope or hose supporting rollers arranged such that in a first, expanded position of the overcenter linkage the channels are positioned adjacent a selected pair of ladder rungs, and in another, latched position of the linkage the channels are moved toward one another in secure engagement with the rungs and the rollers are disposed in a position to support the rope or hose and the like in spaced relation to the rungs.

10 Claims, 8 Drawing Figures

15
16
22
23
32
33
34
36
38
39
40
40'
50
51
52
53
54
55
56
R1
R2
7
8

QUICK-RELEASE ROLLER ATTACHMENT FOR SUPPORTING A ROPE OR HOSE AND THE LIKE ON AN AERIAL LADDER

BACKGROUND OF THE INVENTION

It is sometimes necessary to use aerial ladders on fire fighting equipment and the like in order to reach the upper floors of multistory buildings to effect rescue of persons or to support a hose in an elevated position to direct water onto the roof or into the upper stories of multistory buildings. If the person being rescued is injured, then a rescue basket is used with a rope attached thereto and the rope is strung across one of the rungs near the end of the fly section of the aerial ladder, with the basket suspended therefrom and the basket is lowered to the ground, using the rung as a pulley for supporting the rope and basket. Similarly, when a hose is raised to an elevated position to discharge water onto the roof or into the upper stories of a building, the hose is supported on an uppermost rung of the ladder. The rungs on aerial ladders are typically covered with a friction material and, accordingly, it is not practicable to support the rope or hose directly on the rung, since damage to either the rung or rope or hose, or to both, would probably result.

Therefore, in the prior art several devices are provided for attachment to the rungs of a ladder, which devices have rollers thereon to rollably support the rope or hose. Such prior art devices are either expensive to manufacture or are difficult and time consuming to apply to and remove from the rungs of the ladder or they are subject to being dislodged from the rungs during use thereof.

In accordance with the present invention, a quick attaching and quick releasing roller attachment is provided for aerial ladders, which is economical to manufacture and is quick and easy to apply to and remove from the rungs and which remains in a securely latched position on the rungs during use thereof.

OBJECTS OF THE INVENTION

Accordingly, it is an object of this invention to provide a quick attaching and quick releasing roller attachment for an aerial ladder, wherein the attachment may be quickly and easily applied to and removed from the rungs of the ladder and wherein the attachment is securely locked or latched in operative position when in use.

DETAILED DESCRIPTION OF THE INVENTION

Figure 1:
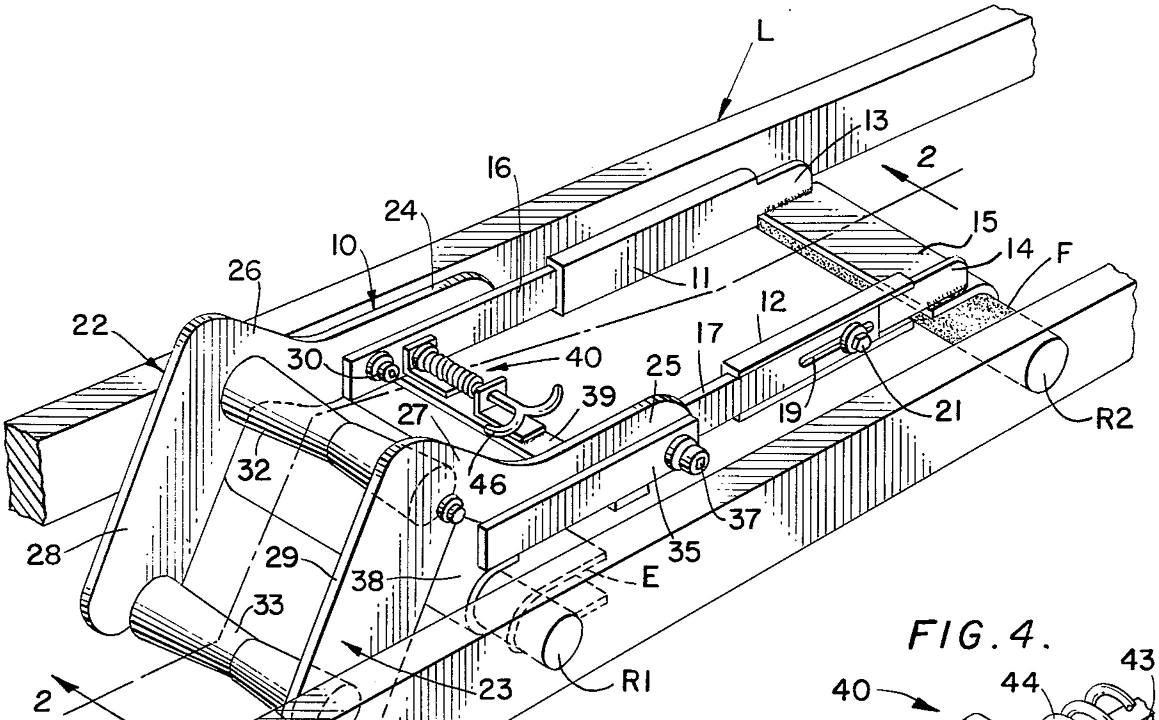
FIG. 1 is an enlarged, fragmentary, perspective view of a portion of a ladder showing the attachment in accordance with the invention secured thereto on a pair of spaced rungs.
Figure 4:
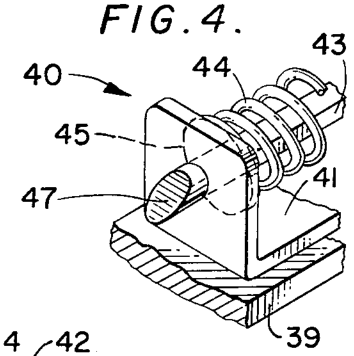
FIG. 4 is a greatly enlarged, fragmentary, perspective view of a portion of the latch of FIG. 3.

In the drawings, wherein like reference numerals indicate like parts throughout the several views, a section of a ladder is indicated generally at L in FIG. 1. Typically, this ladder section would comprise the fly section or topmost section of an aerial ladder. The ladder has a plurality of spaced rungs R1 and R2 and the rungs are covered with a friction material F. Additionally, rung R1 is reinforced by means of a channel-shaped extension E affixed to the rung, as by a weld or the like, and fixed at opposite ends to the inner sides of the risers or side rails of the ladder L. The attachment 10 comprises a pair of elongate, channel-shaped side links 11 and 12, having end extensions 13 and 14 thereon, respectively. The extensions 13 and 14 are welded or otherwise suitably affixed to a channel-shaped rung hook 15.

The channel members 11 and 12 are open or face laterally outwardly, and a pair of elongate side bars 16 and 17 are slidably nested within the channel members 11 and 12. The side bars 16 and 17 have elongate, axially extending slots 18 and 19 therein in the portions thereof slidably nested in the channel members 11 and 12, and a bolt or other suitable fastening device 20 and 21 is secured to the channel members 11 and 12 and extended through the slots 18 and 19 in the side bars 16 and 17 to enable axial adjustment of the side bars relative to the channel members to compensate for variations in the spacing between adjacent rungs of the ladder.

A pair of angularly shaped roller supporting plates 22 and 23 comprise first elongate end portions 24 and 25 and second, intermediate portions 26 and 27 extending at an angle to the axis of the end portions 24 and 25 and third, end portions 28 and 29 extending at an angle to the intermediate portions 26 and 27. The roller supporting plates 22 and 23 are pivotally connected to the ends of side bars 16 and 17 by means of pivot pins or bolts or the like 30 and 31 connected with the ends of the side bars 16 and 17 and with the end portions 24 and 25 adjacent their juncture with the intermediate portions 26 and 27.

A pair of rollers 32 and 33 are pivotally supported on the plates 22 and 23 adjacent opposite ends, respectively, of the end portions 28 and 29 thereof, and the rollers have concave shaped outer surfaces to maintain a rope or hose engaged thereon toward the center of the rollers. Also, the side plates 22 and 23 have a substantial width and project beyond the periphery of the rollers 32 and 33 to provide side guards for preventing displacement of a rope or hose from the ends of the rollers.

A further pair of side bars 34 and 35 are pivotally connected at one end thereof to the ends of end portions 24 and 25 of side plates 22 and 23 by means of suitable pivot pins or bolts or the like 36 and 37, and a channel-shaped, rung engaging hook 38 is welded or otherwise suitably affixed to the other end of the side bars 34 and 35 for engagement with rung R1 of the ladder L.

A transversely extending reinforcing bar 39 is welded or otherwise suitably affixed to the lower edge of the side bars 34 and 35 between the ends thereof.

Figure 3:
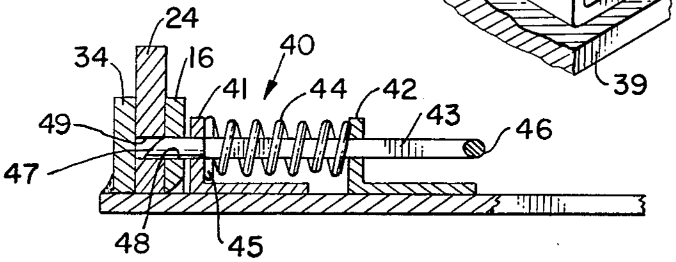
FIG. 3 is an enlarged, fragmentary, sectional view of the safety latch and is taken along line 3—3 in FIG. 2.

In order to positively latch the attachment in its operative position, as viewed in FIG. 1, a latch device 40 is supported on the transverse brace 39 and comprises a pair of upstanding, L-shaped brackets 41 and 42 welded or otherwise suitably affixed to the upper surface of the brace 39 and having aligned openings therethrough in which a latch pin or bolt 43 is slidably received. The latch pin 43 is resiliently urged to the left in latching position, as viewed in FIG. 3, by means of a coil spring or the like 44 disposed around the bolt 43 and engaged between the bracket 42 and a collar 45 suitably affixed on the bolt 43. Suitable finger gripping means 46 are provided on the outer end of the latch bolt for facilitating manipulation thereof. The inner end of the latch bolt has an inclined strike or latch surface 47 extended through an opening 48 in the side bar 16 and into a latch opening 49 in the end portion 24 of side plate 22. The latch bolt 43 and the opening through bracket 42 may have a polygonal cross-sectional shape, if desired, to prevent turning movement of the latch bolt 43 and thus to maintain the latch strike 47 in properly oriented position.

A modified safety latch 40′ is illustrated in FIGS. 5–8, and this latch comprises a ratchet and pawl mechanism comprising a pair of laterally inwardly projecting spaced apart ears or lugs 50 and 51 on the inner surface of side bar 16 pivotally supporting a latch or pawl member 52 therebetween, which has a pawl 53 extended through an opening 54 in the side bar 16 for engagement with a plurality of teeth 55 on the confronting side surface of the end portion 24 of side plate 22. The pawl is maintained in operative engagement with the teeth 55 by means of a spring 56 engaged between the side of side bar 16 and the latch 52.

The roller attachment according to the invention is preferably made of aluminum or another suitable, lightweight yet strong material.

Figures 5, 6, 7, 8:
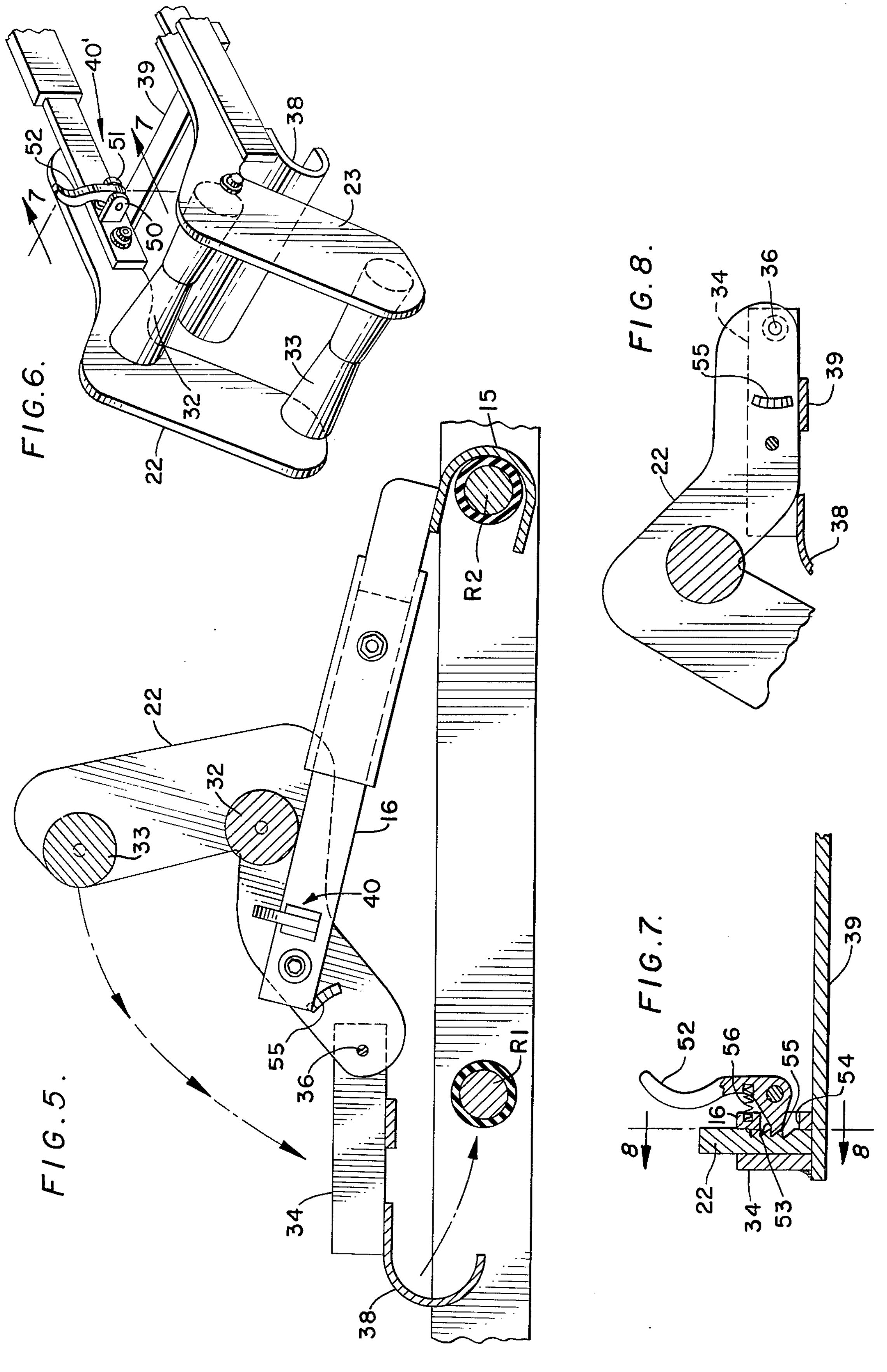
FIG. 5 is an enlarged, fragmentary, sectional view similar to FIG. 2, showing the attachment in an unlatched position.
FIG. 6 is an enlarged, fragmentary, perspective view of a portion of the attachment of the invention.
FIG. 7 is a fragmentary, sectional view taken along line 7—7 in FIG. 6.
FIG. 8 is an enlarged, fragmentary, sectional view taken along line 8—8 in FIG. 7.

Thus in use, the attachment according to the present invention is first opened to the position shown in FIG. 5 and positioned adjacent a pair of spaced rungs R1 and R2, and the side plates 22 and 23 are pivoted forwardly and downwardly in the direction of the arrows, which results in the end portions 24 and 25 thereof swinging to the rear, thus drawing the rung engaging hook 38 into engagement with the rung R1. The side plates 22 and 23 are moved downwardly to their full, latched position, as seen in FIGS. 1, 2 and 6, and in this position the latch 40 or 40′ engages to securely latch the attachment in its operative position.

Figure 2:
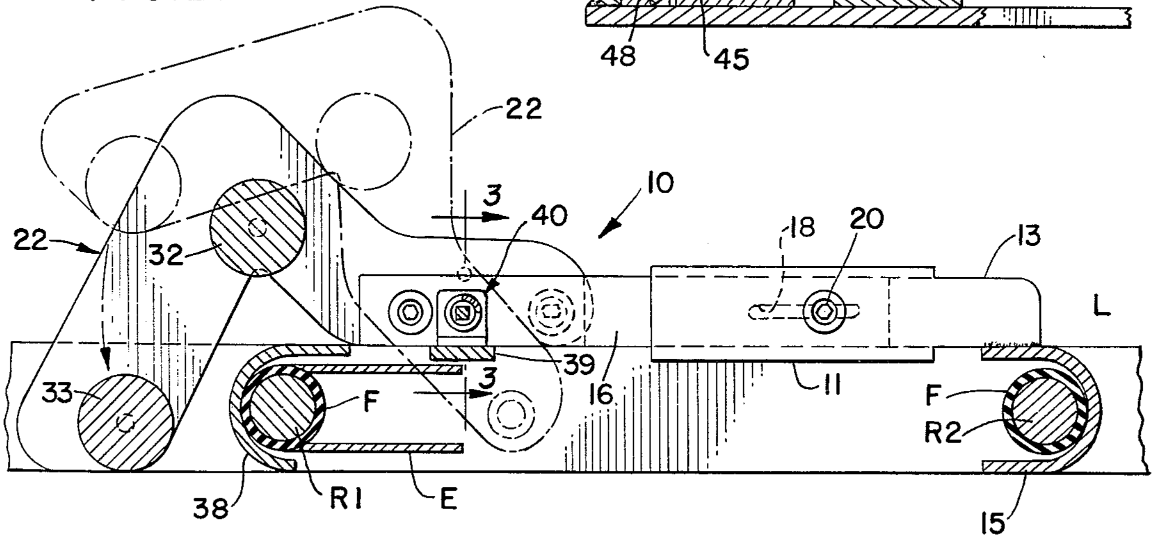
FIG. 2 is an enlarged, fragmentary view in section taken along line 2—2 of FIG. 1, showing the attachment in a latched, operative position in full lines and in an intermediate position in phantom lines.

As seen in FIG. 2, the end of the side plates 22 and 23 does not project below the plane of the ladder, and thus the attachment may be placed on the ladder when it is in its stored position on the supporting vehicle, and the ladder then extended to an elevated, operative position. This has the advantage of enabling the attachment to be placed on the ladder without requiring a fireman or other person to climb the ladder and also enables a rope or hose or the like to be operatively positioned on the roller prior to elevation of the ladder, thus enabling the ladder to be used to raise the rope or hose or the like to the desired elevation.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A quick-release roller attachment for supporting a rope or hose and the like on an aerial ladder, comprising: a first pair of spaced apart, substantially parallel side links; rung-engaging hook means carried by the side links at one end thereof; a pair of spaced apart, substantially parallel roller-supporting side plates pivotally connected between the ends thereof to the other ends of the side links; roller means carried by the side plates adjacent one end thereof and spanning the space therebetween in a position to support a rope or hose and the like thereon; a pair of side bars pivotally connected at one end thereof to the other ends of the side plates, and defining with the side plates and side links an over-center linkage means; and rung-engaging hook means carried by the other ends of the pair of side bars.

2. An attachment as in claim 1, wherein a safety latch is carried by the linkage means to releasably latch the linkage means in an operative position with the hook means securely engaged with the rungs.

3. An attachment as in claim 2, wherein the latch comprises a reciprocable, yieldably biased latch bolt engageable in aligned holes in said linkage means to positively latch the linkage means in its operative position.

4. An attachment as in claim 1, wherein the side links comprise a pair of axially slidably interengaged links, and fastening means connected between the adjustable links so that the length of the side links can be adjusted to change the distance between the rung engaging hook means to accommodate different spacing between rungs of different ladders.

5. An attachment as in claim 4, wherein the hook means comprise channel-shaped members.

6. An attachment as in claim 1, wherein the hook means comprise channel-shaped members.

7. A quick-release roller attachment for supporting a rope or hose and the like on an aerial ladder, comprising: a pair of elongate, parallel, spaced apart side links; first rung-engaging hook means carried by the side links at one end thereof; a pair of substantially identical, spaced apart, angularly shaped side plates pivotally connected between their ends to the other ends of the side links; further linkage means connected to the side plates and defining with the side plates and side links an overcenter linkage means; second rung-engaging hook means carried by the further linkage means in spaced relation to the first hook means, for movement of the hook means relatively toward and away from one another into and out of engagement with a pair of spaced apart rungs upon operation of the overcenter linkage means to releasably support the attachment on a ladder; and a pair of parallel, spaced apart rollers extending between and rotatably supported on said side plates.

8. An attachment as in claim 7, wherein the further linkage means comprises a pair of elongate, spaced apart side bars pivotally connected at one end thereof to one end of said side plates, said rollers carried by the side plates at the other ends thereof, and the second hook means carried by the other ends of the side bars.

9. An attachment as in claim 8, wherein a safety latch means is operatively connected with the side plates to positively latch the linkage means in an operative, overcenter position.

10. An attachment as in claim 9, wherein the latch means comprises a ratchet and pawl mechanism connected between one of the side links and one of the side plates.

* * * * *